US006678763B2

(12) United States Patent
Tasaka et al.

(10) Patent No.: US 6,678,763 B2
(45) Date of Patent: Jan. 13, 2004

(54) PULSE TRANSMISSION LINE CONTROL SYSTEM

(75) Inventors: Akio Tasaka, Ibaraki (JP); Hirokatsu Yui, Ibaraki (JP); Masahumi Ohno, Ibaraki (JP); Masashi Shibata, Ibaraki (JP)

(73) Assignee: Matsushita Electric Industrial Co., Ltd. (JP)

( * ) Notice: Subject to any disclaimer, the term of this patent is extended or adjusted under 35 U.S.C. 154(b) by 97 days.

(21) Appl. No.: 10/145,693

(22) Filed: May 16, 2002

(65) Prior Publication Data

US 2002/0178308 A1 Nov. 28, 2002

(30) Foreign Application Priority Data

May 24, 2001 (JP) ....................................... 2001-154711

(51) Int. Cl.7 ......................... G06F 13/10; G08C 19/28; G08C 23/04; H04C 9/00

(52) U.S. Cl. ............................ 710/62; 710/15; 710/18; 375/256; 375/257; 326/21; 326/26; 326/87; 250/338.1

(58) Field of Search ............................. 710/62, 15, 18; 375/256, 257; 326/21, 26, 87; 250/338.1

(56) References Cited

U.S. PATENT DOCUMENTS

| | | | | |
|---|---|---|---|---|
| 4,316,262 A | * | 2/1982 | Mizuta et al. | 713/502 |
| 5,276,920 A | * | 1/1994 | Kuisma | 455/101 |
| 5,719,509 A | * | 2/1998 | Chan | 327/112 |
| 6,421,390 B1 | * | 7/2002 | Burkhart | 375/257 |

* cited by examiner

*Primary Examiner*—Rehana Perveen
(74) *Attorney, Agent, or Firm*—Parkhurst & Wendel, L.L.P.

(57) ABSTRACT

To provide a pulse transmission line control system that can prevent a malfunction of microcomputers included in an apparatus configured by the microcomputers that have a function of decoding an electrical signal pulse generated from an infrared code sent from an infrared remote control unit. A main microcomputer A (1) controls on/off states of a switch (6) provided in a pulse transmission line (5) and turns on the switch (6) only when a sub-microcomputer B(2) performs a process on the infrared code sent form an infrared remote control unit (3).

3 Claims, 4 Drawing Sheets

PULSE TRANSMISSION LINE CONTROL SYSTEM

FIELD OF THE INVENTION

The present invention relates to a pulse transmission line control system capable of selecting and controlling a transmission of an electrical signal pulse generated from an infrared code sent by an infrared remote control unit to a plurality of microcomputers that decode the electrical signal pulse and process the electrical signal pulse according to the infrared code.

BACKGROUND OF THE INVENTION

Referring to FIG. 4, an apparatus will be described below that includes microcomputers having the function (hereinafter called "system for receiving an infrared remote control unit code pulse") of decoding an electrical signal pulse (hereinafter called "an infrared remote control unit code pulse") generated from an infrared code sent by an infrared remote control unit.

This apparatus is a combination of a new microcomputer G10 and an existing microcomputer H11. In this apparatus, when an infrared code is sent from an infrared control unit 3, an infrared ray detector 4 receives and converts the infrared code into an infrared remote control unit code pulse. The infrared remote control unit code pulse is transmitted to the microcomputers G10 and H11 over a pulse transmission line 5. Then, the microcomputer G10 or H11 decodes the infrared remote control unit code pulse to perform an operation requested by the infrared remote control unit 3 (requested by an operator).

However, in the apparatus in which all the microcomputers having the system for receiving an infrared remote control unit code pulse always receive the infrared remote control unit code pulse sent from the infrared ray detector as described above, while a microcomputer is performing a main operation, the same infrared remote control unit code pulse is also transmitted to the other microcomputers over the pulse transmission line and the other microcomputers also decode the infrared remote control unit code pulse. If the decode is effective, the other microcomputers operate according to the decoded information. As a result, it is feared that the apparatus according to prior art can perform unintended operation.

DISCLOSURE OF THE INVENTION

The present invention has been achieved in order to solve the problem and it is an object of the present invention to provide a pulse transmission line control system so that in an apparatus including a plurality of microcomputers each having a system for receiving an infrared remote control unit code pulse, one of the plurality of microcomputers has a function of controlling on/off operation of a switch and the other microcomputers are connected to a pulse transmission line through the switch, and the switch is controlled to transmit the infrared remote control unit code pulse only to one or more of the microcomputers that perform a process required for operation, thereby preventing a malfunction of the microcomputers.

The pulse transmission line control system according to the present invention is a system including a main microcomputer and a sub-microcomputer for performing a process according to an infrared code sent from an infrared remote control unit. The system includes an infrared ray detector for receiving the infrared code and converting the received infrared code into an electrical signal pulse, a pulse transmission line for transmitting the pulse to the main microcomputer and the sub-microcomputer, and a switch for connecting the sub-microcomputer to the pulse transmission line, wherein the main microcomputer selects and controls the switch according to whether or not transmission of the pulse to the sub-microcomputer is permitted and the pulse is transmitted to the sub-microcomputer when the transmission is permitted.

According to the present invention, the pulse transmission line control system is characterized in that a plurality of the sub-microcomputers are provided, each of the sub-microcomputers being provided with the switch, and the main microcomputer selects and controls the switch so that the pulse is transmitted only to one or more of the sub-microcomputers that perform a process required for operation.

Further, according to the present invention, the pulse transmission control system is characterized in that when the main microcomputer turns on the switch according to the received infrared code, the main microcomputer turns on the switch after the input of a pulse generated from the infrared code is completed.

Further, according to the present invention, in an apparatus including a plurality of microcomputers having a system for receiving an infrared remote control unit code pulse, a switch or switches can be controlled so that the infrared remote control unit code pulse is transmitted only to one or more of the microcomputers that perform a process required for operation and, as a result, a malfunction of the microcomputers can be prevented.

DESCRIPTION OF THE EMBODIMENTS

Embodiments of a pulse transmission line control system of the present invention will be described below with reference to the accompanying drawings.

First Embodiment

Figure 1:
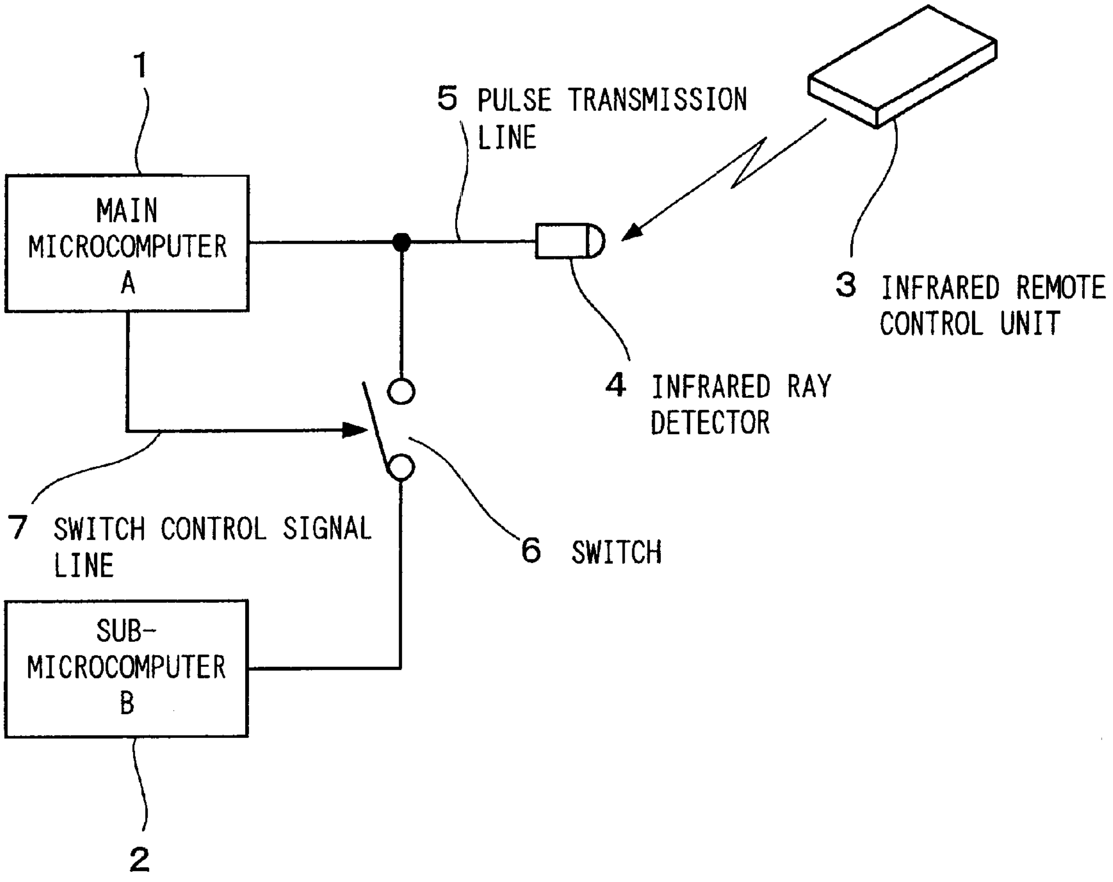
FIG. 1 is a block diagram of an apparatus including microcomputers having a system for receiving an infrared remote control unit code pulse according to a first embodiment of the present invention.

FIG. 1 is a block diagram of an apparatus including microcomputers having a system for receiving an infrared remote control unit code pulse according to a first embodiment. In FIG. 1, reference numbers 1 and 2 denote a main microcomputer A and a sub-microcomputer B, respectively, having the system for receiving an infrared remote control unit code pulse. A main microcomputer A1 is a new microcomputer and a sub-microcomputer B2 is an existing microcomputer. Reference number 3 denotes an infrared remote control unit that sends an infrared code corresponding to a request from an operator. Reference number 4 denotes an infrared ray detector for receiving the infrared code from the infrared remote control unit and converting it into an infrared remote control unit code pulse. Reference number 5 denotes a pulse transmission line for transmitting the infrared remote control unit code pulse and 6 denotes a switch for switching on/off the pulse transmission line 5 connected to the sub-microcomputer B2. When the switch 6 is turned to an on-state, the main microcomputer A1 is connected in parallel with the sub-microcomputer B2, as shown in FIG. 1. Reference number 7 denotes a switch control signal line for transmitting a control signal from the main microcomputer A1 to the switch 6. In this apparatus, the main microcomputer A1 has the function of controlling the switch 6 according to an internal state transition and is responsible for controlling the entire apparatus in executing an operation requested by the operator.

If the main microcomputer A1 permits an infrared remote control unit code pulse to be provided to the sub-microcomputer B2, the main microcomputer A1 sends an ON control signal to the switch 6 to bring the pulse transmission line 5 connected to the sub-microcomputer B2 into conduction. Because the pulse transmission line 5 is in the conduction state, the infrared remote control unit code pulse sent from the infrared ray detector 4 is transmitted to the sub-microcomputer B2.

Furthermore, if the main microcomputer A1 does not permit an infrared remote control unit code pulse to be provided to the sub-microcomputer B2, the main microcomputer A1 sends an OFF control signal to the switch 6 to block the pulse transmission line 5 connected to the sub-microcomputer B2. Because the pulse transmission line 5 is blocked, the infrared remote control unit code pulse from the infrared ray detector 4 is not transmitted to the sub-microcomputer B2.

Second Embodiment

Figure 2:
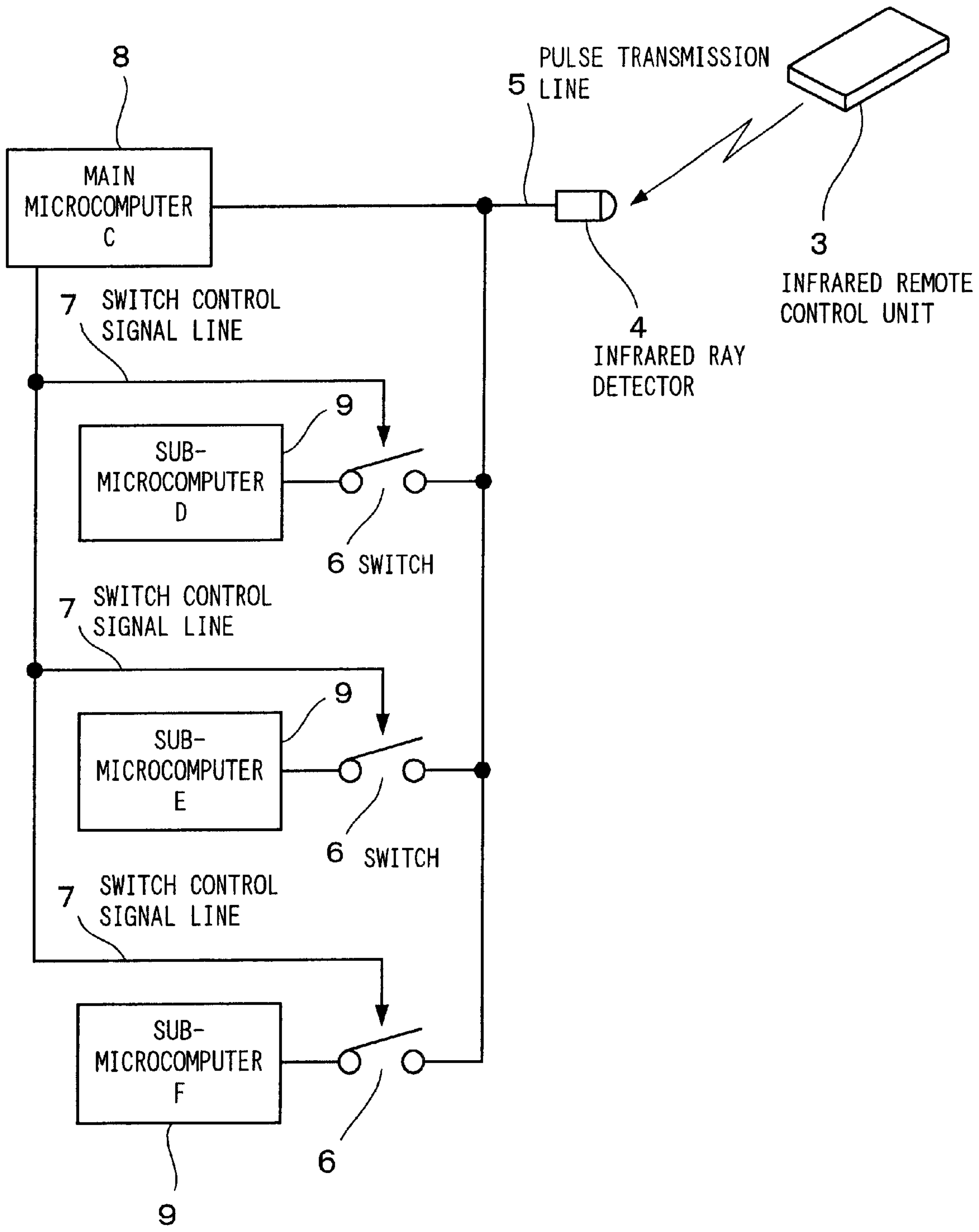
FIG. 2 is a block diagram of an apparatus including microcomputers having a system for receiving an infrared remote control unit code pulse according to a second embodiment of the present invention.

FIG. 2 is a block diagram of an apparatus including microcomputers having a system for receiving an infrared remote control unit code pulse according to a second embodiment. Components having the same configuration as those in the first embodiment described above are labeled with the same reference numbers and the description of which will be omitted.

In this apparatus, a main microcomputer C8 and a sub-microcomputers D, E, and F (hereinafter collectively called "sub-microcomputers DEF 9") have a system for receiving an infrared remote control unit code pulse. The main microcomputer C8 is a new microcomputer and the sub-microcomputers DEF 9 are existing microcomputers. Switches 6 are used for switching on/off a pulse transmission line 5 connected to the sub-microcomputers DEF 9. When a switch 6 is turned on, the main microcomputer C8 is connected in parallel with the one of the sub-microcomputers DEF 9 that is associated with the switch, as shown in FIG. 2. In this apparatus, the main microcomputer C8 has the function of controlling the switch 6 according to an internal state transition and is responsible for controlling the entire apparatus in executing an operation requested by the operator.

If the main microcomputer C8 permits an infrared remote control unit code pulse to be provided to one of the sub-microcomputers DEF 9, the main microcomputer C8 sends an ON control signal to the associated switch 6 to bring the pulse transmission line 5 to the sub-microcomputer DEF 9 into conduction. Because the pulse transmission line 5 is in the conduction state, the infrared remote control unit code pulse sent from the infrared ray detector 4 is transmitted to the sub-microcomputer DEF 9.

If the main microcomputer C8 does not permit the infrared remote control unit code pulse to be provided to on or more of the sub-microcomputers DEF 9, the main microcomputer C8 sends an OFF control signal to the associated switch(es) 6 to block the pulse transmission line 5 connected to the sub-microcomputers DEF 9. Because the pulse transmission line 5 is blocked, the infrared remote control unit code pulse from the infrared ray detector 4 is not transmitted to the sub-microcomputer(s) DEF 9.

The apparatus in the second embodiment may be any apparatus that uses a plurality of microcomputers having the system for receiving an infrared remote control unit code pulse but not all of the plurality of microcomputers are required to have the system for receiving an infrared remote control unit code pulse. The number of existing microcomputers having the system for receiving an infrared remote control unit code pulse is not limited to three. Furthermore, various controls can be performed by combining switches in different ways or controlling the switches separately.

Figure 3:
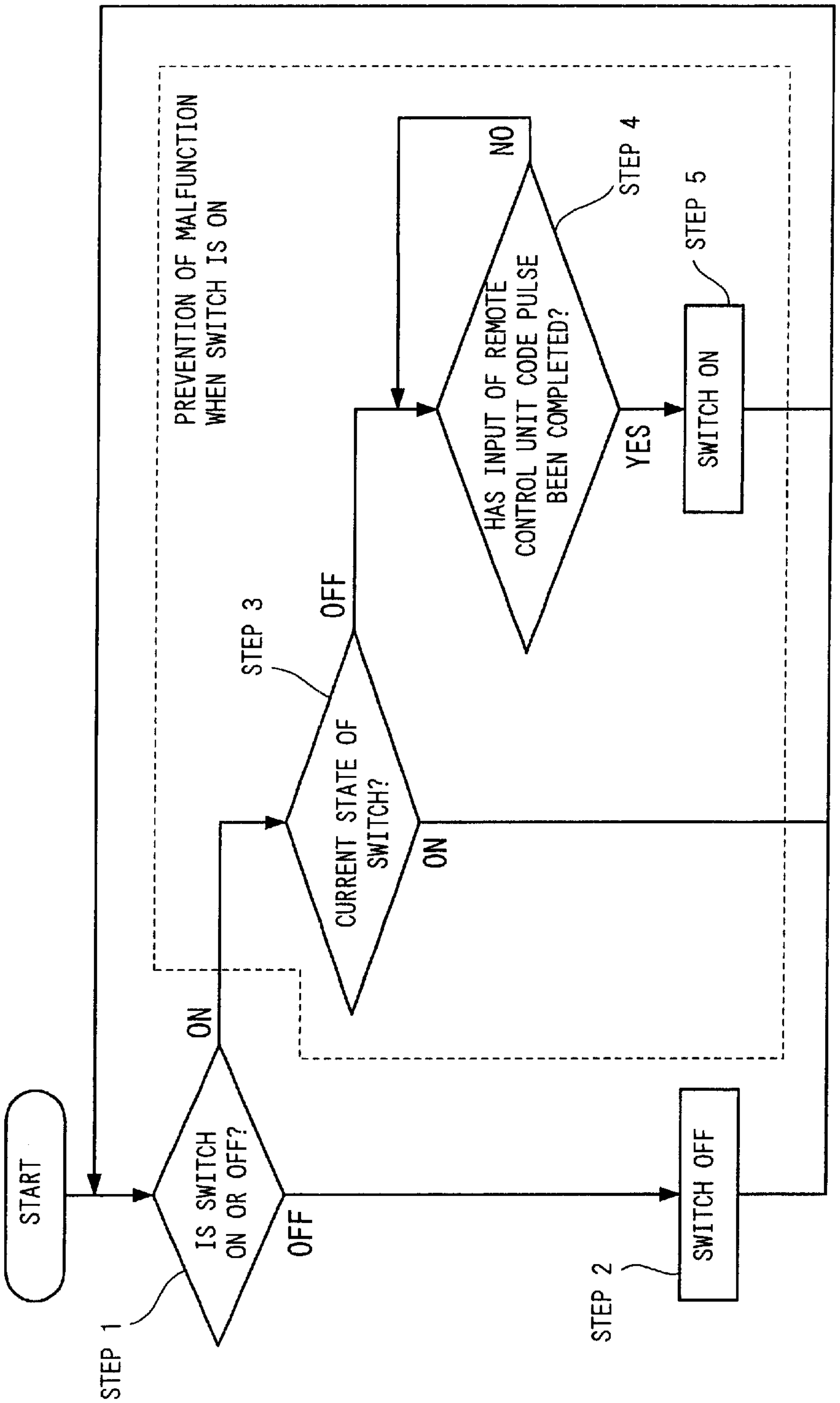
FIG. 3 is a flowchart of a switching process performed by the microcomputers having a switching control function according to the first and second embodiments of the present invention.
Figure 4:
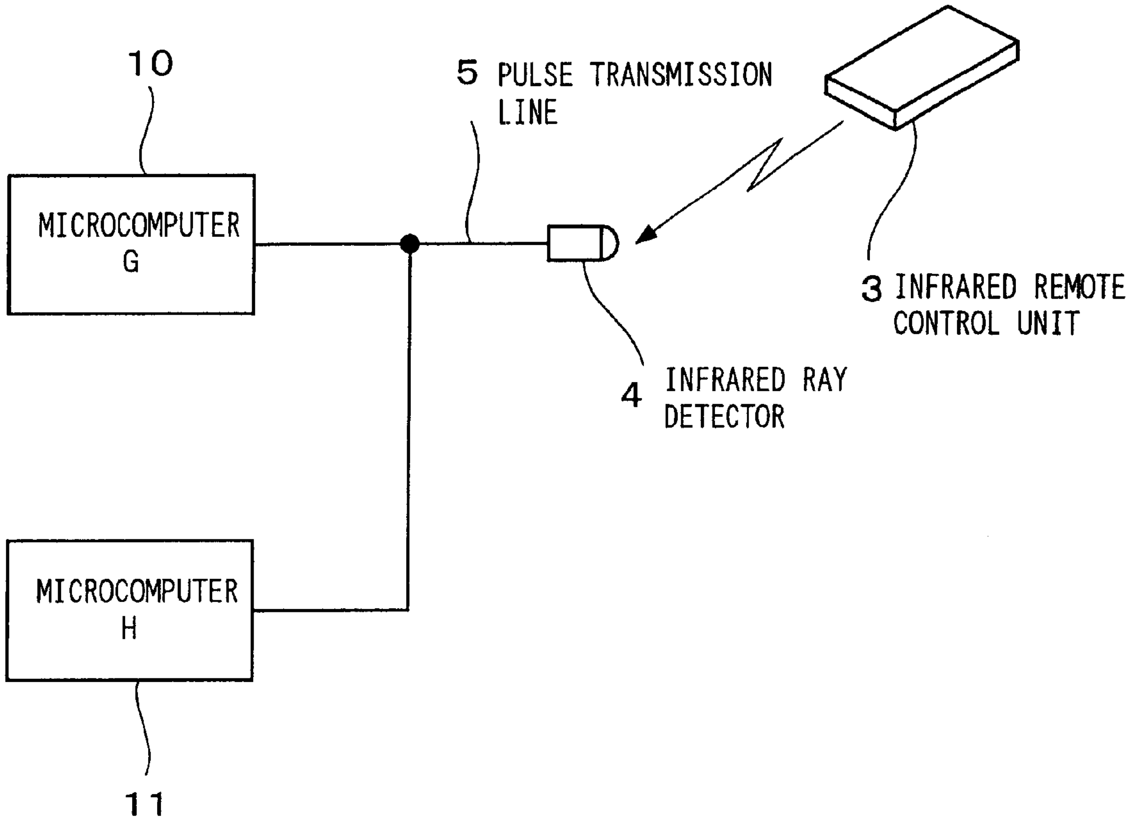
FIG. 4 PRIOR ART
FIG. 4 is a block diagram of an apparatus including microcomputers having a system for receiving an infrared remote control unit code pulse according to a prior art.

Successively, referring to FIGS. 1 and 3, a process performed by a main microcomputer having the switch control function in the first and second embodiments will be described below in which the main microcomputer turns on a switch 6 while infrared remote control unit code pulses are being inputted in series into the main microcomputer.

First of all, at step 1, the microcomputer A1 determines whether the switch 6 should be turned on or off, based on an internal state transition that corresponds to an infrared remote control unit code pulse. When it determines that the switch 6 should be turned off, it sends an OFF control signal to the switch 6 at step 2. When it determines that the switch 6 should be turned on, the process proceeds to step 3.

At step 3, the main microcomputer A1 checks the current state of the switch 6. When the switch 6 is in the off-state, the process proceeds to step 4 in order to turn it on. When the switch 6 is in the on-state at step 3, the on-state is maintained.

At step 4, the main microcomputer A1 checks to see whether the input of the transmitted infrared remote control unit code pulse has been completed. If the input of the infrared remote control unit code pulse into the main microcomputer A1 has not been completed yet, turning on the switch 6 would cause the same infrared remote control unit code pulse as that being inputted into the main microcomputer A1 to also be inputted into a sub-microcomputer B2 and, as a result, the sub-microcomputer B2 can perform an unintended operation. Therefore, if the input of the infrared remote control unit code pulse into the main microcomputer A1 has not been completed yet, it does not turn on the switch 6 but keeps the switch 6 in the off-state. After the main microcomputer A1 determines that the input of the infrared remote control unit code pulse into the main microcomputer A1 has been completed, it proceeds to step 5 to turn on the switch 6.

While the first and second embodiments have been described with respect to apparatuses in which a combination of a new microcomputer and existing microcomputers is used, the apparatuses may of course be configured with the new microcomputers alone.

According to the present invention, in an apparatus including a plurality of microcomputers having a system for receiving an infrared remote control unit code pulse, the function of controlling the on/off states of one of the plurality of microcomputers is added to one of the plurality of microcomputers in such a way that the other microcomputers are connected to a pulse transmission line through the switch, and the switch is controlled so that an infrared remote control unit code pulse is transmitted only to a microcomputer that performs a process required for operating the apparatus. Thus, the present invention can prevent a malfunction of the microcomputers and especially advantageous in apparatuses where existing microcomputers are exploited.

What is claimed is:

1. A system including a main microcomputer and a sub-microcomputer for performing a process according to an infrared code sent from an infrared remote control unit, comprising:

an infrared ray detector for receiving said infrared code and converting said received infrared code into an electrical signal pulse;

a pulse transmission line for transmitting said pulse to said main microcomputer and said sub-microcomputer; and a switch for connecting said sub-microcomputer to said pulse transmission line, wherein said main microcomputer selects and controls said switch according to whether or not transmission of said pulse to said sub-microcomputer is permitted and said pulse is transmitted to said sub-microcomputer when the transmission is permitted.

2. The pulse transmission line control system according to claim 1, wherein a plurality of said sub-microcomputers are provided, each of said sub-microcomputers being provided with said switch, and said main microcomputer selects and controls said switches so that said pulse is transmitted only to one or more of said sub-microcomputers that perform a process required for operation.

3. The pulse transmission control system according to claim 1, wherein when said main microcomputer turns on said switch according to the received infrared code, said main microcomputer turns on said switch after the input of a pulse generated from said infrared code is completed.

* * * * *

US006678763C1

(12) EX PARTE REEXAMINATION CERTIFICATE (5259th)

United States Patent

Tasaka et al.

(10) Number: US 6,678,763 C1

(45) Certificate Issued: Jan. 24, 2006

(54) PULSE TRANSMISSION LINE CONTROL SYSTEM

(75) Inventors: Akio Tasaka, Ibaraki (JP); Hirokatsu Yui, Ibaraki (JP); Masahumi Ohno, Ibaraki (JP); Masashi Shibata, Ibaraki (JP)

(73) Assignee: Matsushita Electric Industrial Co., Ltd., Kadoma (JP)

Reexamination Request:
No. 90/007,314, Nov. 22, 2004

Reexamination Certificate for:

| | |
|---|---|
| Patent No.: | **6,678,763** |
| Issued: | **Jan. 13, 2004** |
| Appl. No.: | **10/145,693** |
| Filed: | **May 16, 2002** |

(30) Foreign Application Priority Data

May 24, 2001 (JP) ....................................... 2001-154711

(51) Int. Cl.
*G06F 13/10* (2006.01)
*G08C 19/28* (2006.01)

(52) U.S. Cl. ........................... 713/201; 710/15; 710/18; 710/62; 375/256; 375/257; 326/21; 326/26; 326/87; 250/338.1; 713/200; 713/202

(58) Field of Classification Search .................. 710/62, 710/18, 15; 375/256, 257; 326/21, 26, 87; 250/338.1; 713/200, 201, 202
See application file for complete search history.

(56) References Cited

U.S. PATENT DOCUMENTS 5,473,318 A 12/1995 Martel .................... 340/825.31
6,359,547 B1 3/2002 Denison et al. ............ 340/5.73

*Primary Examiner*—A. Elamin

(57) ABSTRACT

To provide a pulse transmission line control system that can prevent a malfunction of microcomputers included in an apparatus configured by the microcomputers that have a function of decoding an electrical signal pulse generated from an infrared code sent from an infrared remote control unit. A main microcomputer A (1) controls on/off states of a switch (6) provided in a pulse transmission line (5) and turns on the switch (6) only when a sub-microcomputer B(2) performs a process on the infrared code sent form an infrared remote control unit (3).

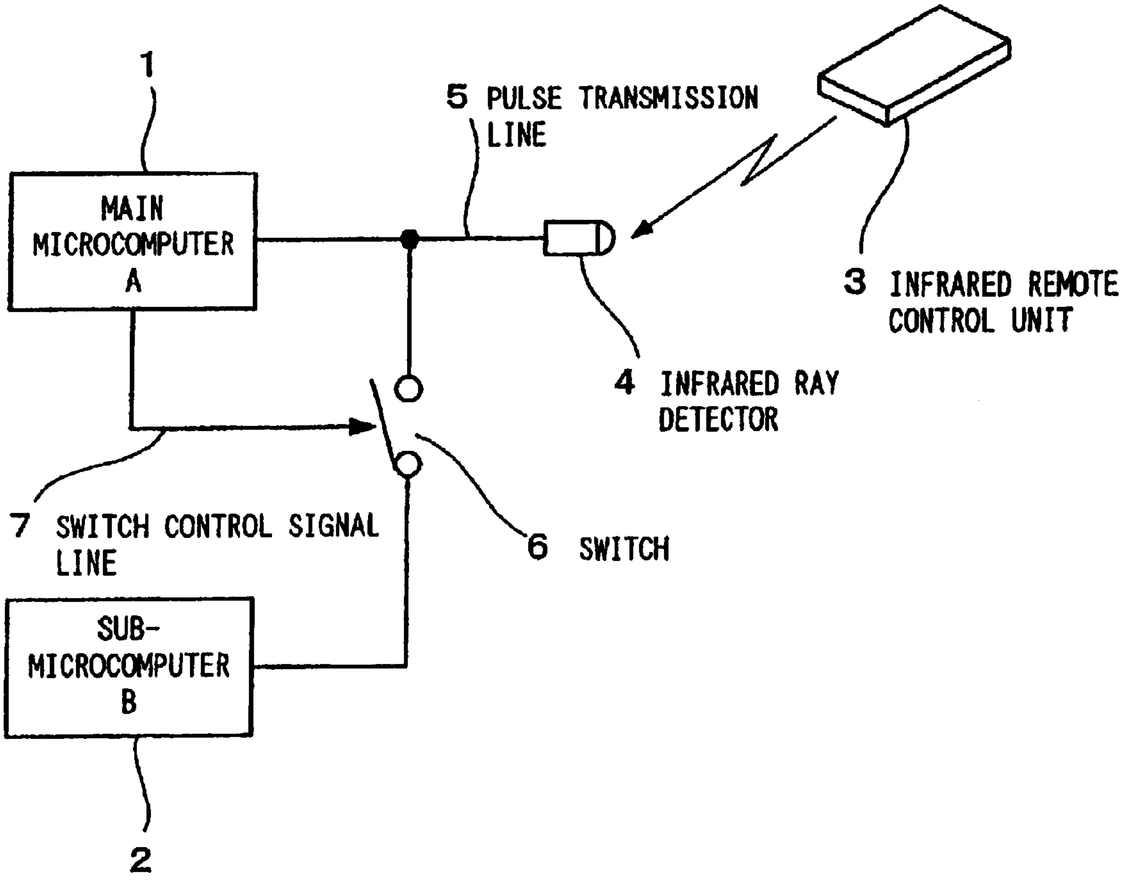

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *